(12) United States Patent
Lee et al.

(10) Patent No.: US 9,500,475 B2
(45) Date of Patent: Nov. 22, 2016

(54) METHOD AND APPARATUS FOR INSPECTING AN OBJECT EMPLOYING MACHINE VISION

(71) Applicants: GM GLOBAL TECHNOLOGY OPERATIONS LLC, Detroit, MI (US); SungyKyunKwan University Foundation for Corporate Collaboration, Gyeonggi-Do (KR)

(72) Inventors: Sukhan Lee, Gyeonggi-Do (KR); Quang-Lam Bui, Gyeonggi-Do (KR); Jianying Shi, Oakland Township, MI (US)

(73) Assignees: GM Global Technology Operations LLC, Detroit, MI (US); SungyKyunKwan University Foundation for Corporate Collaboration, Gyeonggi-Do (KR)

( * ) Notice: Subject to any disclaimer, the term of this patent is extended or adjusted under 35 U.S.C. 154(b) by 0 days.

(21) Appl. No.: 14/592,125

(22) Filed: Jan. 8, 2015

(65) Prior Publication Data

US 2016/0202050 A1 Jul. 14, 2016

(51) Int. Cl.
*G06K 7/10* (2006.01)
*G01B 11/25* (2006.01)

(52) U.S. Cl.
CPC .................. *G01B 11/2513* (2013.01)

(58) Field of Classification Search
CPC .................. G06K 7/10722; G06K 7/10732; G06K 7/1417
USPC .................. 235/462.01, 454, 462.09, 462.1
See application file for complete search history.

(56) References Cited

U.S. PATENT DOCUMENTS

| 7,522,764 | B2* | 4/2009 | Schwotzer | A61B 1/24 356/601 |
| 7,986,321 | B2* | 7/2011 | Zhuang | G01B 11/2545 345/426 |
| 8,326,020 | B2 | 12/2012 | Lee et al. | |
| 9,030,486 | B2* | 5/2015 | Boker | G06T 9/001 345/473 |
| 2008/0279446 | A1* | 11/2008 | Hassebrook | G01B 11/2513 382/154 |

FOREIGN PATENT DOCUMENTS

WO 2013132494 A1 9/2013

OTHER PUBLICATIONS

Salvi; Pages; Batlle; "Pattern codification strategies in structured light systems"; Elsevier Ltd.; Mar. 6, 2003; doi:10.1016/j.patcog.2003.10.002.

* cited by examiner

*Primary Examiner* — Daniel St Cyr
(74) *Attorney, Agent, or Firm* — Quinn Law Group, PLLC

(57) ABSTRACT

A machine vision system including a digital camera can be employed to inspect an object in a field of view. This includes projecting digitally-generated light patterns including first and second boundary patterns and first and second spatial patterns onto the object in the field of view. Images associated with the projected light patterns including the object are captured. Spatial cells are found in the field of view by matching codes in the first and second spatial patterns to boundaries determined based upon one of the first and second boundary patterns. The spatial cells are found in the field of view by matching codes in the spatial patterns to boundaries determined based upon the boundary patterns. The spatial cells are decoded and matched to the boundaries. Three-dimensional (3D) point cloud data of the object is generated based upon the decoded spatial cells matched to the boundaries.

18 Claims, 3 Drawing Sheets

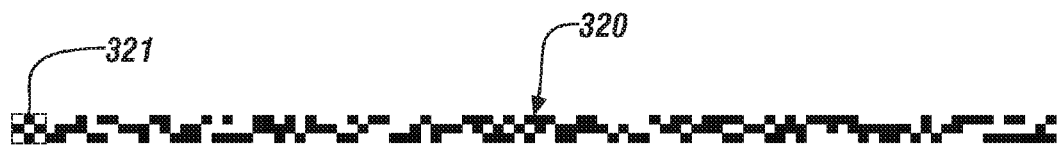
FIG. 3-3
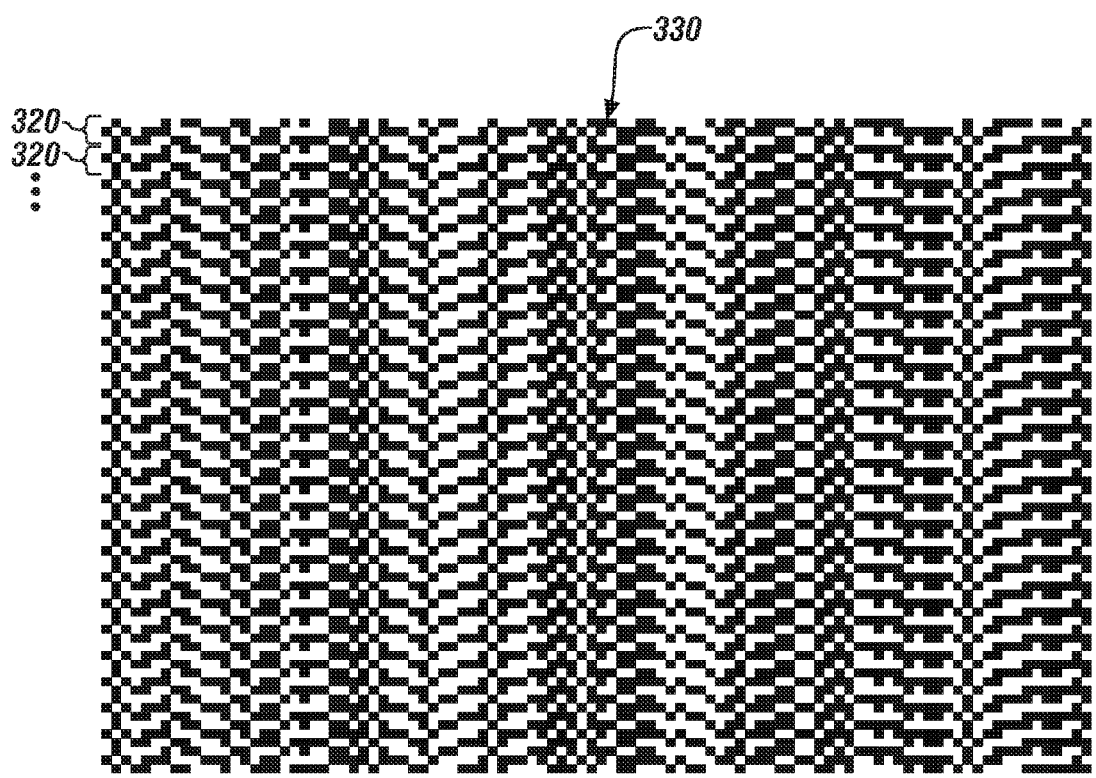
FIG. 3-4
FIG. 3-5

METHOD AND APPARATUS FOR INSPECTING AN OBJECT EMPLOYING MACHINE VISION

TECHNICAL FIELD

The present disclosure relates to machine vision systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Imaging systems are employed in manufacturing environments to automatically inspect stationary components. Imaging systems seek to determine three-dimensional (3D) information about an object in a field of view for quality inspection, reverse engineering, robotics and similar systems. Such systems employ structural lighting as part of a stereo imaging system to project light onto a field of view, capturing digital images of an object in the field of view and employing geometric methodology and decoding techniques to calculate image depth(s) using the digital images.

SUMMARY

A machine vision system including a digital camera can be employed to inspect an object in a field of view. One method for inspecting the object includes projecting a plurality of digitally-generated light patterns including first and second boundary patterns and first and second spatial patterns onto the object in the field of view. A plurality of images including the object is captured via the digital camera, wherein each image is associated with one of the projected light patterns. Spatial cells are found in the field of view by matching codes in the first and second spatial patterns to boundaries determined based upon one of the first and second boundary patterns. The spatial cells are found in the field of view by matching codes in the first and second spatial patterns to boundaries determined based upon one of the first and second boundary patterns. The spatial cells are decoded and matched to the boundaries. Three-dimensional (3D) point cloud data of the object is generated based upon the decoded spatial cells matched to the boundaries.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which:

FIG. 2 schematically shows a 3D point cloud generation routine for generating a 3D point cloud from a FOV from images captured employing a digital camera, in accordance with the disclosure;

FIG. 3-1 schematically shows an embodiment of the first boundary projection pattern that can be communicated to the projector for optical projection into the FOV including a plurality of nominally vertical strips, which can be generated as a first binary strip pattern wherein cells of the image bits alternate between a 1 value (light) and a 0 value (no light), in accordance with the disclosure;

FIG. 3-2 schematically shows an embodiment of the second boundary projection pattern that can be communicated to the projector for optical projection into the FOV including a plurality of nominally vertical strips, which can be generated as a first binary strip pattern wherein cells of the image bits alternate between a 0 value (no light) and a 1 value (light), in accordance with the disclosure;

FIG. 3-3 schematically shows a portion of a spatial projection pattern in the form of a 3×3 block of cells providing a spatial pattern that can be encoded by 9 bits, with each bit corresponding to one of the cells, in accordance with the disclosure;

FIG. 3-4 schematically shows a projection pattern set containing three rows assembled from a plurality of horizontally-adjacent 3×3 blocks of cells wherein each of the 3×3 block of cells is based upon a randomly generated 9-bit code string analogous to the 3×3 spatial pattern described with reference to FIG. 3-3, in accordance with the disclosure; and FIG. 3-5 shows an example of a first full screen spatial projection pattern that is created by repeating the projection pattern set shown with reference to FIG. 3-4 across the projection resolution of the projector, in accordance with the disclosure.

DETAILED DESCRIPTION

Figure 1:
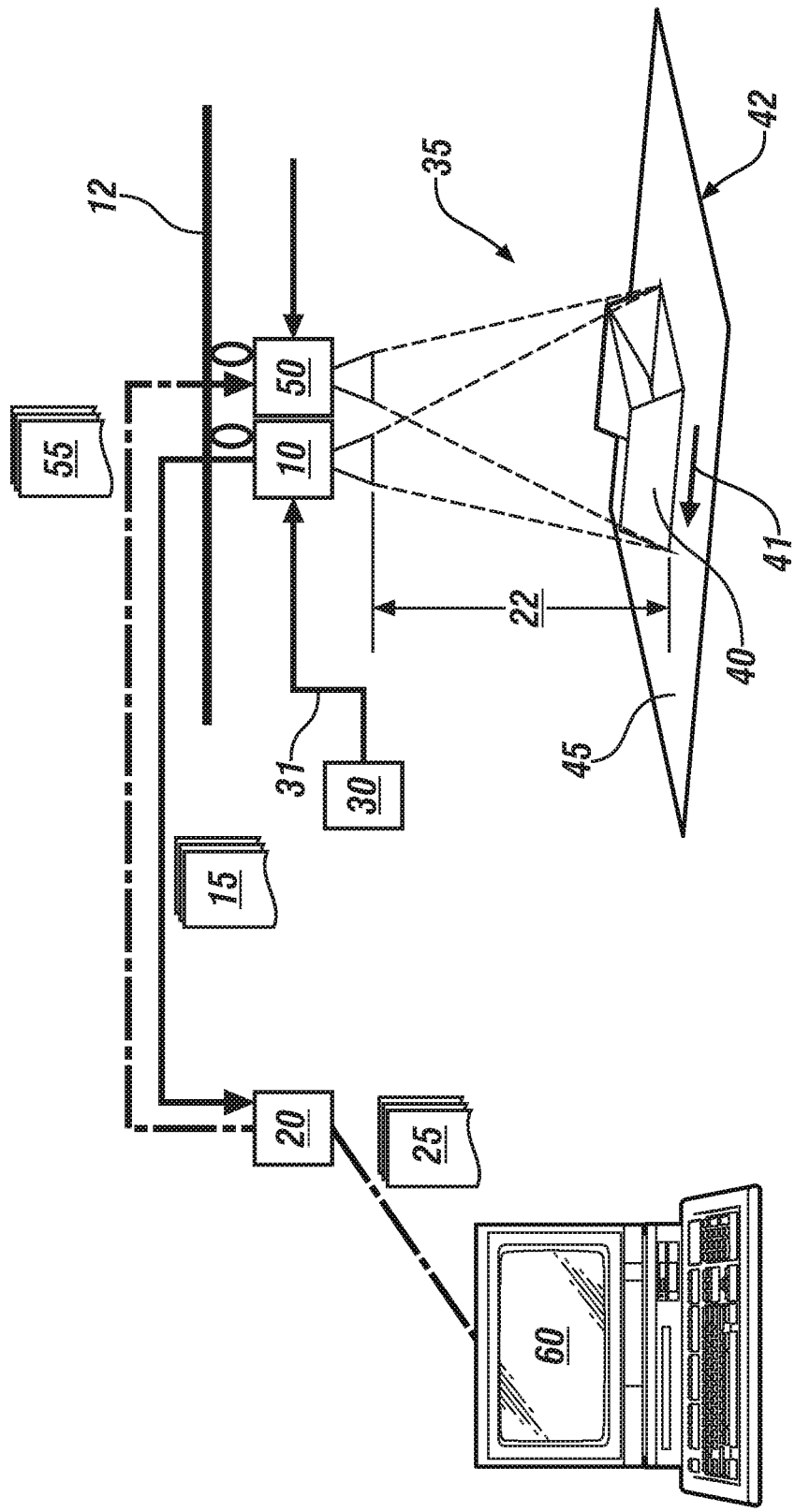
FIG. 1 schematically illustrates an exemplary vision system including an image detector (camera), an adjacent controllable light projector, a camera/projector controller and an analytic controller, in accordance with the disclosure.

Referring now to the drawings, wherein the depictions are for the purpose of illustrating certain exemplary embodiments only and not for the purpose of limiting the same, FIG. 1 schematically illustrates an exemplary vision system including an image recorder (camera) 10 and an adjacent controllable light projector 50 that both signally connect to a camera/projector controller 20 and an analytic controller 60. A system trigger mechanism 30 signally connects the camera 10, the projector 50, and controller 20.

The camera 10 is preferably a digital image recording device capable of capturing a two-dimensional (2D) image 15 of a field of view (FOV) 35 in response to a trigger signal generated by the trigger mechanism 30. A stereo camera is not required in one embodiment, since a single image with an imposed or projected pattern as described herein is sufficient to derive the object shape and depth in the FOV 35. By way of definition, an image is any visually perceptible depiction representing a field of view. An image may encompass all or a portion of reflected light in the field of view from a visual light spectrum in one embodiment, including a red-green-blue (RGB) reflection, a black-and-white reflection, a grayscale reflection, or any other suitable or desirable reflection. Preferably, an image is captured and recorded in a non-transitory storage medium, such as in a non-transitory digital data storage medium or on photographic film.

The camera 10 can be at any position and orientation relative to the FOV 35. In one embodiment, the FOV 35 includes an object 40 oriented on a moveable plane 45 that is at a predetermined distance 22 from the camera 10 and the light projector 50. The object 40 is a structural entity having features including by way of example spatial dimensions, materials and surface finishes indicating reflectivity, among others. In one embodiment, the object 40 can be a component or area on a vehicle in an assembly plant.

In one embodiment, the object 40 oriented on the moveable plane 45 is mounted on a first conveying system 42 that conveys the object 40 in a linear path 41 at a known rate of speed, and the camera 10 and the light projector 50 are mounted on a second conveying system 12 that conveys them in a corresponding linear path at the known rate of speed for a fixed distance. The linear path 41 in which the object 40, the camera 10 and the light projector 50 are conveyed includes the FOV 35, and the external trigger mechanism 30 monitors the FOV 35.

In one embodiment, the 2D image 15 captured by the camera 10 is a bitmap image file in the form of an 8-bit grey scale image that represents the FOV 35. Other embodiments of the 2D image 15 can include a 2D color image represented by Hue-Saturation-Intensity (HSI triplets) or Red, Green, and Blue (RGB) primary colors of the FOV or other image representations without limitation. The camera 10 includes an image acquisition sensor that signally connects to the camera/projector controller 20 that executes digital signal processing (DSP) on the 2D image 15. The image acquisition sensor captures pixels in the FOV 35 at a predetermined resolution, and the camera/projector camera/projector 20 generates a bitmap image file 25 of the FOV 35, e.g., an 8-bit bitmap of the pixels representing the FOV 35 at a predefined resolution. The camera/projector controller 20 generates the bitmap image file 25, which is communicated to the controller 20. The bitmap image file 25 is an encoded datafile stored in a non-transitory digital data storage medium in one embodiment. The bitmap image file 25 includes a digital representation of a 2D image that may include one or a plurality of objects 40 with a projected and super-imposed encoded light pattern and represents an original image of the FOV 35 captured at the original resolution of the camera 10. Example super-imposed encoded light patterns are described with reference to FIGS. 3-1 through 3-5. The 2D image 15 includes the object 40 with a super-imposed encoded light pattern projected thereon as captured in the FOV 35. The image acquisition sensor of the camera 10 captures the 2D image 15 of the FOV 35 at a nominally standard-definition resolution, e.g., 640×480 pixels. Alternatively, the image acquisition sensor of the camera 10 may capture the 2D image 15 at a nominally high-definition resolution, e.g., 1440×1024 pixels, or at another suitable resolution. The image acquisition sensor of the camera 10 preferably captures the 2D image 15 in the form of a plurality of still images. The 2D image 15 is converted to the bitmap image file 25 for storage and analysis.

The light projector 50 can be any known digital light processing (DLP) projector device configured to generate optical images in response to digital input signals at a known projection resolution. By way of a non-limiting example, the projector can have a projection resolution of 854×480 pixels in one embodiment.

The camera/projector controller 20 digitally generates light patterns 55 that are communicated to the light projector 50, which optically projects the light patterns 55 into the FOV 35. Exemplary light patterns 55 projected into the FOV 35 are described in detail with reference to FIGS. 3-1 through 3-5.

The exemplary vision system provides a structured light camera system composed of the light projector 50, the camera 10 and camera/projector controller 20. The camera 10 has a general purpose IO (GPIO) port and the light projector 50 and camera/projector controller 20 employ videographics array (VGA) connector ports. The VGA port of the controller 20 connects to the VGA port of the light projector 50 to control pattern projection, and the VGA port of the controller 20 also connects to the GPIO port of the camera 10 to control the shutter speed and the start of image capture. The hardware connection synchronizes the timing between the light projector 50 and the camera 10.

In response to an external trigger signal 31 from the trigger 30 to the GPIO port of the camera 10, the camera 10 opens its shutter for a preset shutter time associated with a preferred exposure time. In one embodiment, the trigger signal 31 has a pulsewidth of at least 1 us. The camera shutter speed includes a delay time on the order of less than 10 us. The preset shutter time is set for an appropriate exposure time. After the camera 10 closes the shutter, there may be a delay on the order of 1 ms for data capture, after which the data is transferred to the controller 20. The data transfer time to the controller is near 30 ms, and is a fixed magnitude related to the camera model, which has a predetermined image capture and transfer rate (frames per second). Thus, the entire cycle time from start of the trigger to end of data transfer is less than 40 ms in one embodiment.

Controller, control module, module, control, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality, including data storage and data analysis. Software, firmware, programs, instructions, routines, code, algorithms and similar terms mean any controller-executable instruction sets including calibrations and look-up tables.

Figures 1, 2, 3:
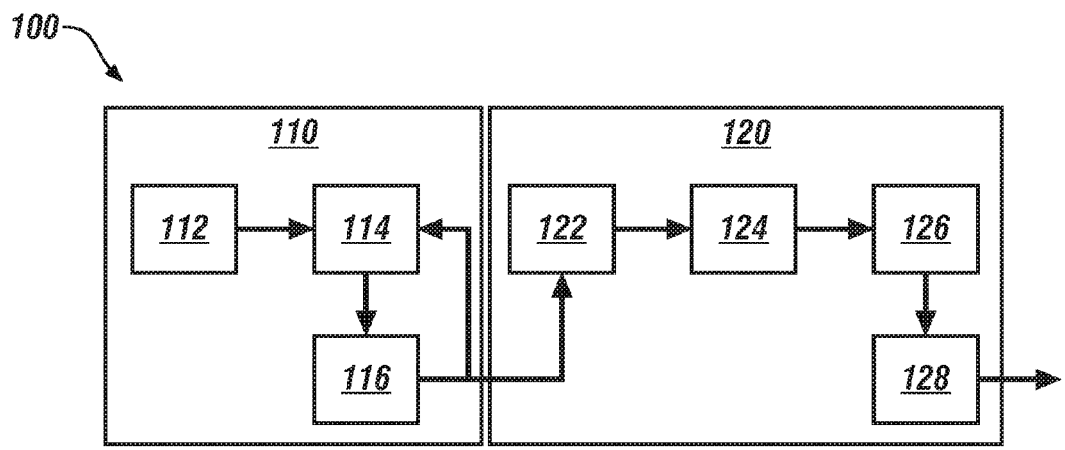

FIG. 2 schematically shows a 3D point cloud generation routine 100 for generating a 3D point cloud from a FOV from images captured employing a digital camera, e.g., an embodiment of the vision system described with reference to FIG. 1 that includes an image recorder (camera) 10 and an adjacent controllable light projector 50 that are both signally connected to a camera/projector controller 20 signally connected to a trigger mechanism 30 and an analytic controller 60. Table 1 is provided as a key wherein the numerically labeled blocks and the corresponding functions are set forth as follows, corresponding to the 3D point cloud generation routine 100.

TABLE 1

| BLOCK | BLOCK CONTENTS |
|---|---|
| 110 | Data Capture |
| 112 | Trigger |
| 114 | Sequentially generate and project encoded projection patterns into FOV |
| 116 | Synchronously capture bitmap image file of FOV for each projection pattern |
| 120 | Decode bitmap image files of FOV for all projection patterns |
| 122 | Matching epipolar lines to boundaries in a lower layer to find a center of spatial cells in the FOV |
| 124 | Decoding the spatial cells |
| 126 | Matching the decoded spatial cells to boundaries in the lower layer |
| 128 | Generating a 3D point cloud based upon the decoded spatial cells |

Overall, the 3D point cloud generation routine 100 includes a data capture segment 110 and a data processing and decoding segment 120. In one embodiment, the data capture segment 110 takes approximately 180 ms to execute from time of trigger initiation until data in the form of multiple bitmap image files of the FOV for the projection patterns is communicated to the data processing and decoding segment 120, and the data processing and decoding segment 120 takes approximately 80 ms to execute to generate 3D point cloud data.

The data capture segment 110 executes as follows. In response to a trigger event (112), the camera/projector controller 20 communicates sequential messages in the form of multiple digitally-generated light patterns 55 to the projector 50 for optical projection into the FOV 35 (114). The trigger event can be caused by an object, e.g., object 40 moving completely within the FOV 35, or another suitable trigger event. The camera 10 synchronously captures a bitmap image file of the FOV 35 including the object 40 with each of the light patterns 55 projected thereon (116). The camera/projector controller 20 digitally generates the light patterns 55 in a sequential manner, which includes communicating one of the light patterns 55 to the projector 50 for optical projection into the FOV 35, commanding the camera 10 to open a shutter of the camera 10 for an exposure period, and capturing a bitmap image file with the camera 10 and communicating it to the camera/projector controller 20 for correspondence with one of the light patterns 55. The process is repeated until all of the light patterns 55 are projected into the FOV and corresponding bitmap image files of the FOV are captured. In one embodiment this includes projecting four light patterns 55 and capturing four sequential bitmap image files.

FIGS. 3-1 through 3-5 each schematically shows one embodiment of the light patterns 55 sent to the projector 50 for optical projection into the FOV 35, including first and second projection patterns 302 and 304, respectively and a first spatial pattern 330. FIG. 3-1 schematically shows an embodiment of the first boundary projection pattern 302 that can be communicated to the projector 50 for optical projection into the FOV 35. In one embodiment, the first boundary projection pattern 302 includes a plurality of nominally vertical strips, which can be generated as a first binary strip pattern 305 wherein cells of the image bits alternate between a 1 value (light) as shown by way of example in cell 301 and a 0 value (no light) as shown by way of example in cell 303 in a nominally horizontal direction. Each of the cells 301, 303, etc., has a 4×4 pixel resolution in one embodiment. The 4×4 pixel resolution is referred to as fine or a fine resolution pattern in one embodiment. The first binary strip pattern 305 is repeated across each horizontal line at the projector's resolution to form the first boundary pattern 302. Thus, the resultant image projected into the FOV is a plurality of alternating black and white strips at a first location.

FIG. 3-2 schematically shows an embodiment of the second boundary projection pattern 304 that can be communicated to the projector 50 for optical projection into the FOV 35. In one embodiment, the second boundary projection pattern 304 includes a plurality of nominally vertical strips, which can be generated as a second binary strip pattern 308 wherein cells of the image bits are inverses of the image bits in the first boundary projection pattern 302, and thus alternate between a 0 value (no light) as shown by way of example in cell 307 and a 1 value (light) as shown by way of example in cell 309 in a nominally horizontal direction. Each of the cells 307, 309, etc., represents a 4×4 pixel resolution in one embodiment. The second binary strip pattern 308 is repeated across each horizontal line at the projector's resolution to form the second boundary pattern 304. Thus, the resultant image projected into the FOV is a plurality of alternating black and white stripes at a second location. In one embodiment, a single one of the first and second boundary projection patterns 302, 304 may be suitable to estimate boundaries for constructing a three-dimensional (3D) point cloud from 2D images. Employing both the first and second boundary projection patterns 302, 304 improves robustness and accuracy in identifying fine boundaries including common boundaries and middle boundaries.

FIG. 3-3 schematically shows a portion of a spatial projection pattern in the form of a 3×3 spatial pattern of cells 310 providing a spatial pattern of cells that can be encoded by 9 bits, with each bit corresponding to one of the cells, shown by way of example as cell 311. Each of the cells has an 8×8 pixel resolution in one embodiment. The 8×8 pixel resolution is referred to as coarse or a coarse resolution pattern. The portion of the spatial projection pattern is one embodiment of a randomly generated 3×3 spatial pattern. As shown, each 3×3 spatial pattern of cells 310 can be represented by a binary code in the form of a 9-bit code string having a binary value of 010111010 wherein the 0 value indicates no light and the 1 value indicates light for a corresponding cell. The binary value translates to a decimal value of 186 when the least significant bit is in the upper left corner of the 3×3 spatial pattern of cells 310 and the most significant bit is in the lower right corner of the 3×3 spatial pattern of cells 310. A skilled practitioner can develop 3×3 spatial patterns and accompanying binary and decimal values for all possible combinations thereof.

FIG. 3-4 schematically shows a projection pattern set 320 containing three rows assembled from a plurality of horizontally-adjacent 3×3 spatial pattern of cells 321 arranged along a nominally horizontal line, as shown by way of example in one 3×3 spatial pattern of cells 321, wherein each 3×3 spatial pattern of cells 321 is based upon a randomly generated 9-bit code string analogous to the 3×3 spatial pattern of cells 310 described with reference to FIG. 3-3. The size of each of the cells in each of the blocks of cells is 8×8 pixels. Preferably there is no repeated code for any other of the randomly generated 3×3 block of cells in each of the rows. The 3×3 blocks of cells can generate 200 unique codes out of 800 pixels in the horizontal direction. In one embodiment, at least 9 bits are required for encoding to achieve a symmetrical representation. There is no difference between a randomly generated and a pre-determined pattern. However, randomly generating the pattern associated with each of the 3×3 spatial patterns is easier to execute than making pre-determined patterns. Since the pattern is randomly generated, the pattern must be stored and used as a lookup table in a subsequently executed decoding algorithm 120. The code can be generated for the first 3 rows, i.e., for each projection pattern set 320, and then repeated for subsequent rows until the pattern image in the full-screen is filled, as described with reference to FIG. 3-5.

FIG. 3-5 shows an example of a first full screen spatial projection pattern 330 that is generated by repeating the projection pattern set 320 shown with reference to FIG. 3-4 in a nominally vertical direction across the projection resolution of the projector, which is 854×480 pixels in one embodiment. In one embodiment, the size of each cell can be 8×8 pixels or another suitable quantity of pixels, depending on the configuration of the hardware system, taking into account working distance, projector resolution and camera resolution. A second full screen spatial projection pattern (not shown) is a light inverse of the third pattern 330 shown with reference to FIG. 3-5, i.e., each of the 0 value cells are transformed to 1 value cells and each of the 1 value cells are transformed to 0 value cells. The third full screen projection pattern 330 and the fourth full screen projection pattern in the form of the light inverse of the third pattern 330 are referred to as spatial patterns, and are employed for coarse bitmap encoding.

Referring again to FIG. 2, the data processing and decoding segment 120 includes a process to evaluate the bitmap image files of the FOV for all of the layers of the projection patterns, including matching epipolar lines in the spatial projection patterns 330 shown in FIG. 3-4 to boundaries in one or more of the lower layers that includes the first and second boundary patterns 302 and 304 to find a center of spatial cells in the FOV (122). This step takes advantage of the fine resolution patterns 302, 304 shown in FIGS. 3-1 and 3-2 having a 4×4 pixel resolution that is half the 8×8 pixel resolution of the coarse resolution pattern in the spatial projection patterns 330 shown in FIG. 3-4, which allows the fine resolution patterns associated with the first and second boundary patterns 302, 304 to be employed to find the epipolar lines in the spatial projection patterns 330. This is executed to detect boundaries in the bitmap image files of the FOV for all four of the projection patterns. Decoding the cells of the spatial projection patterns 330 follows boundary detection (124) to form regions in each of the layers of the projection patterns. The decoded cells of the spatial projection patterns 330 are matched to boundaries in the first and second boundary patterns 302 and 304 (126), and the output is provided for 3D triangulation to generate a 3D point cloud (128). The 3D point cloud is the output of the system and can be sent from the controller 20 to another locus for use in a specific application.

To decode the spatial pattern, 3×3 cell blocks are evaluated and decoded using a lookup table that is based upon the pre-generated 3×3 spatial patterns wherein each of the 3×3 spatial patterns is represented by a binary code that includes a 0 value indicating no light and a 1 value indicating light for each cell.

Each vertical boundary of each cell in the spatial projection patterns 330 has a common boundary in the first and second boundary patterns 302 and 304. This information can be used to match the boundaries and define their binary code as either a 0 value (no light) or a 1 value (light). The controller searches the data along epipolar lines to select blocks of 3×3 spatial patterns to decode. After decoding the spatial projection patterns 330, the boundaries in the first and second boundary patterns 302 and 304 inherit the decoded values and refine their correspondence values. These boundaries are aligned with boundaries in the first and second boundary patterns 302 and 304 and decoded using 3×3 blocks including the boundaries.

Epipolar lines are related to epipolar geometry, which is the geometry related to location correspondence whereby geometric relations between the 3D points and their projections onto the 2D images lead to constraints between image points generated by camera viewing a 3D scene, and these relations are derived based on the assumption that the cameras can be approximated by a pinhole camera model.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A method for inspecting an object in a field of view employing a machine vision system including a digital camera, comprising:
    projecting a plurality of digitally-generated light patterns onto the object in the field of view, wherein the digitally-generated light patterns include first and second boundary patterns and first and second spatial patterns;
    capturing, via the digital camera, a plurality of images including the object, each image associated with one of the projected light patterns;
    finding spatial cells in the field of view by matching codes in the first and second spatial patterns to boundaries determined based upon one of the first and second boundary patterns;
    decoding the spatial cells;
    matching the decoded spatial cells to the boundaries; and
    generating three-dimensional (3D) point cloud data of the object based upon the decoded spatial cells matched to the boundaries;
    wherein the first spatial pattern comprises a full screen spatial projection pattern including a plurality of projection pattern sets arranged in a nominally vertical direction, each projection pattern set including a plurality of projection cells horizontally arranged along a line, each projection cell including a spatial pattern of cells determined based upon a randomly generated code string, wherein each bit of the code string has a light value of 1 or a light value of 0.

2. The method of claim 1, wherein capturing a plurality of images comprises sequentially capturing a plurality of two-dimensional (2D) images, wherein each of the 2D images is associated with one of the projected light patterns.

3. The method of claim 1, wherein projecting a plurality of digitally-generated light patterns onto the object in the field of view comprises sequentially projecting the digitally-generated light patterns including the first and second boundary patterns and the first and second spatial patterns onto the object in the field of view.

4. The method of claim 3, wherein the first boundary pattern comprises a binary strip pattern including a plurality of nominally vertical strips, wherein cells of the strip pattern alternate between a light value of 1 and a light value of 0 along a horizontal line.

5. The method of claim 4, wherein the cells of the strip pattern alternate between a light value of 1 and a light value of 0 along a horizontal line in a fine resolution.

6. The method of claim 4, wherein each of the cells has a 4×4 pixel resolution.

7. The method of claim 3, wherein the second boundary pattern comprises a binary strip pattern wherein cells of the second projection pattern are light-inverse to the cells of the first projection pattern.

8. The method of claim 1, wherein the second projection pattern is optional.

9. The method of claim 1, wherein each projection cell includes a 3×3 block of projection cells including a randomly generated 9-bit code string corresponding to the 3×3 block of projection cells.

10. The method of claim 9, wherein each of the projection cells has a light value of 1 or a light value of 0 at a coarse resolution.

11. The method of claim 9, wherein each of the projection cells has an 8×8 pixel resolution.

12. The method of claim 1, wherein the second spatial pattern comprises a spatial pattern that is a light inverse of the first spatial pattern.

13. The method of claim 12, wherein the second spatial pattern is optional.

14. A method for inspecting an object in a field of view employing a machine vision system including a two-dimensional (2D) digital camera and a light projector, the method comprising:

in response to a trigger signal generated by the object in the field of view:

sequentially projecting, via the light projector, a plurality of digitally-generated light patterns into the field of view, wherein the digitally-generated light patterns include at least one boundary pattern and at least one spatial pattern;

synchronously capturing, via the 2D digital camera, a plurality of images, each image associated with one of the sequentially projected light patterns;

finding spatial cells in the field of view by matching codes in the at least one spatial pattern to boundaries determined based upon the at least one boundary pattern;

decoding the spatial cells;

matching the decoded spatial cells to the boundaries in the lower layer; and generating three-dimensional (3D) point cloud data of the object based upon the decoded spatial cells matched to the boundaries;

wherein the at least one spatial projection pattern comprises a full screen spatial projection pattern including a plurality of projection pattern sets arranged in a nominally vertical direction, each projection pattern set including a plurality of projection cells horizontally arranged along a line, each projection cell including a spatial pattern of cells determined based upon a randomly generated code string corresponding to the block of projection cells, wherein each bit of the code string has a light value of 1 or a light value of 0.

15. The method of claim 14, wherein the at least one boundary pattern comprises a binary strip pattern including a plurality of nominally vertical strips, wherein cells of the strip pattern alternate between a light value of 1 and a light value of 0 along a horizontal line.

16. The method of claim 15, wherein the cells of the strip pattern alternate between a light value of 1 and a light value of 0 along a horizontal line in a fine resolution including a 4×4 pixel resolution.

17. The method of claim 14, wherein each projection cell includes a 3×3 block of projection cells including a randomly generated 9-bit code string corresponding to the 3×3 block of projection cells.

18. The method of claim 17, wherein each of the projection cells has a light value of 1 or a light value of 0 at a coarse resolution including an 8×8 pixel resolution.

* * * * *